W. CONNOLLY.
TRAVERSE MECHANISM GEARING.
APPLICATION FILED AUG. 12, 1916.

1,245,876.

Patented Nov. 6, 1917.
3 SHEETS—SHEET 3.

UNITED STATES PATENT OFFICE.

WILLIAM CONNOLLY, OF MANCHESTER, ENGLAND.

TRAVERSE-MECHANISM GEARING.

1,245,876.

Specification of Letters Patent.

Patented Nov. 6, 1917.

Application filed August 12, 1916. Serial No. 114,646.

*To all whom it may concern:*

Be it known that I, WILLIAM CONNOLLY, a British subject, residing at Blackley, city of Manchester, England, have invented certain new and useful Improvements in Traverse-Mechanism Gearing, of which the following is a specification.

This invention relates to traverse motions for wire winding machines actuated by a double thread reversing screw or a number of screws of different lengths.

It consists of a plurality of double threaded reversing screws of either different lengths or different pitch, or both arranged concentrically around a single drive (thus occupying a minimum amount of space), and not placed at or split up over different parts of a machine with separate drives; and traversing nuts thereon, any one of which can be thrown into and out of gear with the screws to stop one of the traverse bars or permit the screw to be removed from its bearings and replaced by another screw of different length or pitch without interference with other working parts.

The invention will be fully described with reference to the accompanying drawings.

Figure 1:
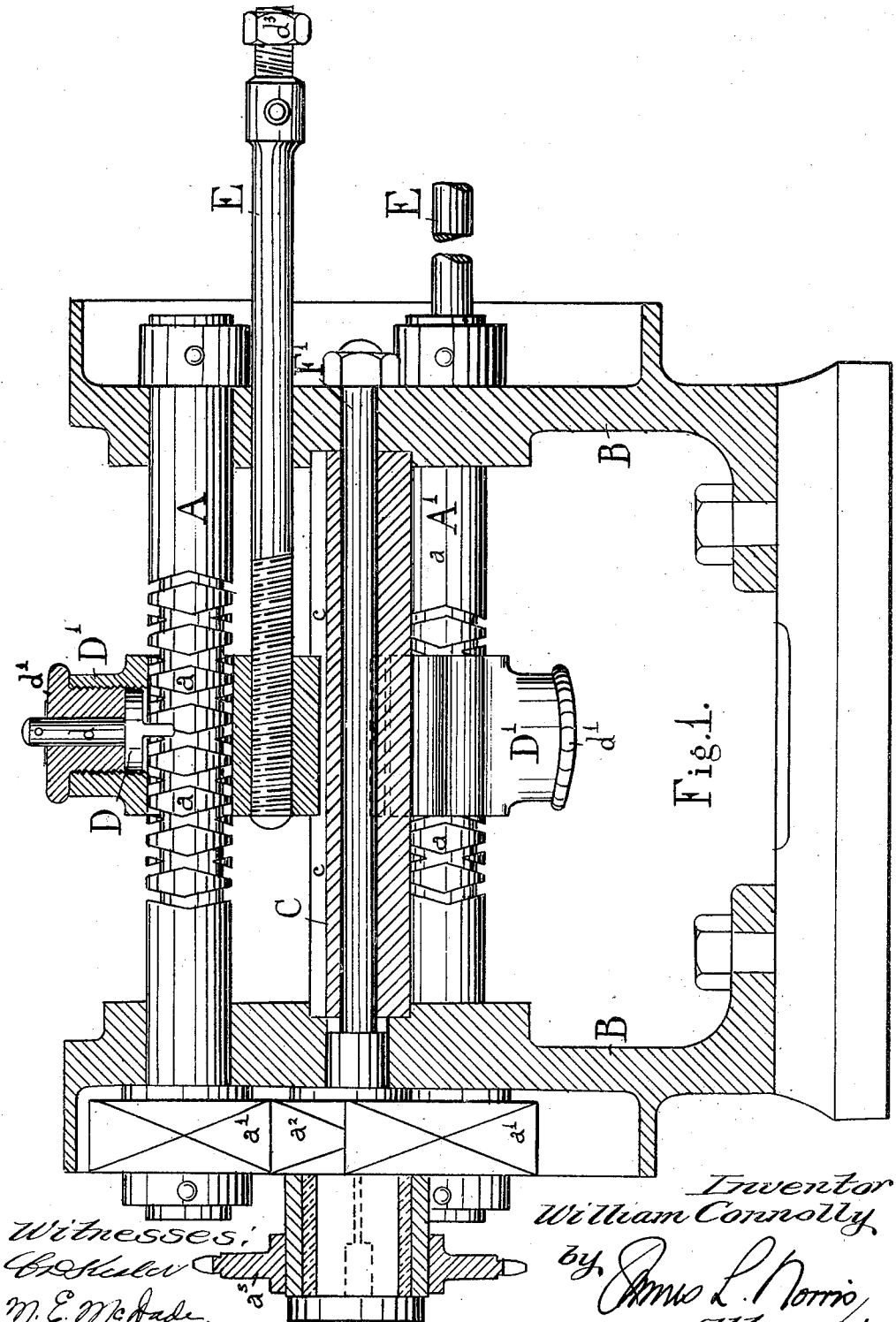
Figure 1 is a longitudinal section.
Figure 2:
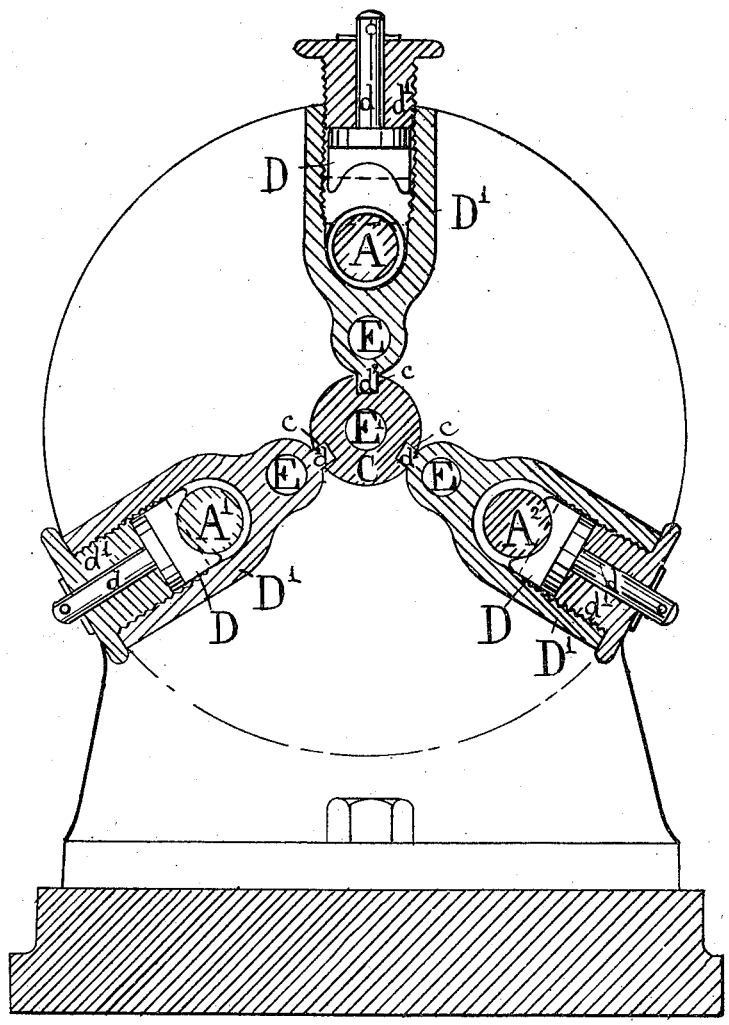
Fig. 2 is a transverse section.
Figure 3:
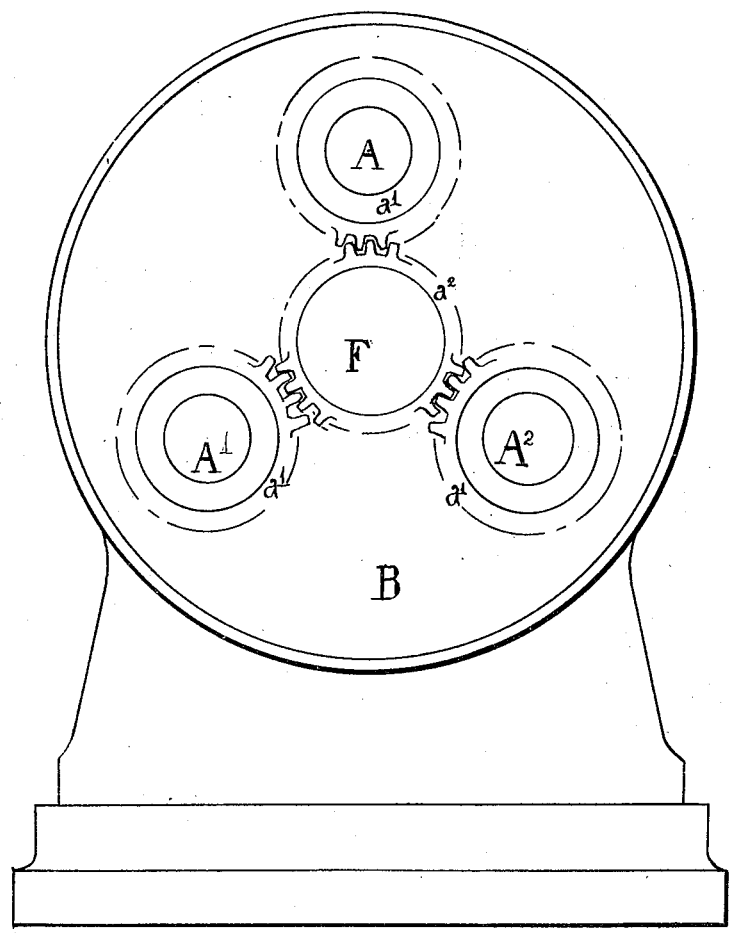
Fig. 3 is an end elevation.

The apparatus is constructed with a suitable number of traverse screws, three screws A A' A² being shown in the present instance. These screws are mounted in bearings in supporting frame ends B around a central shaft C, each screw having a double or reversing thread $a$. The threaded portions $a$ of the screws are of different lengths and consequently give different lengths of traverse to the nuts D which engage with them.

One of these nuts D is mounted upon each screw and fits within the thread $a$ and is carried by a nut box D'. It is provided with a shank $d$ journaled in a screw cap $d'$ by which it can be moved to and fro to bring it into or out of mesh with the screw as may be required. The lower end $d^2$ of the nut box D is made flat to engage a slot $c$ in the central shaft C.

When any nut D is withdrawn from contact with its screw A, the traverse bar connected therewith is stopped and the screw may be withdrawn longitudinally from its bearings and another of different length or pitch be substituted therefor without interfering with any of the other screws or their driving gear.

To each nut box D' a connecting rod E is adjustably attached, by which the movement of the traverse nut D is transmitted to the traverse bar. The rod E is preferably provided with a right hand screw thread at one end and a left hand screw at the other end, by which correct alinement of the traverse guide is assured for any thickness of bobbin flange without collars or packings. The traverse bar is attached to the free end of the connecting rod E by the nut $d^3$ or other suitable coupling device.

The central shaft C is preferably hollow and mounted upon a stay F'. It is provided with three longitudinal guide slots $c$ into which the flattened ends $d^2$ of the nut boxes fit to guide them in their traverse and prevent them rotating with the screws A A' A².

The screws A A' A² are driven by pinions $a'$ secured on their ends from a central pinion $a^2$ loose on a bush F on the stay bar F', on the boss of which latter a sprocket wheel $a^3$ or other driving wheel is fitted.

The pitch of the screws may be different instead of, or in addition to, making them of different lengths, so that if desired the traverse of one may be slower than that of another.

When the machine is in operation, all three screws will be rotated simultaneously; and if all the nuts are in contact with their respective screws, then all the traverse bars will be operated, but by withdrawing one or two of the nuts the corresponding traverse bars will remain stationary although the screw revolves. For example, assuming that the screws are cut for traverses $3\frac{1}{4}''$, $3\frac{1}{2}''$ and 4", and that six bobbins require winding four bobbins of $3\frac{1}{2}''$ traverse and two bobbins of $3\frac{1}{4}''$ traverse, then one nut will be disengaged from the screw and the other two traverse bars will be worked; but all six bobbins can be worked by any of the said traverses.

What I claim as my invention and desire to protect by Letters Patent is:—

1. Traverse mechanism gearing, comprising a central shaft; a plurality of double-threaded reversing screws disposed concentrically around said shaft; means for driving said screws from said shaft; a traveling nut box mounted on each screw; a nut movably fitted in each nut box; and a rotatable screw cap associated with each nut to move the same into or out of engagement with the threads of the adjacent screw; said shaft having a plurality of slots, one for each nut box, wherein said nut boxes are engaged, to control said nut boxes laterally.

2. Traverse mechanism gearing, comprising a central shaft, a stay bolt passing therethrough, end frames secured in position thereby, a plurality of double threaded reversing screws disposed around the central shaft and journaled in the end frames, a plurality of nut boxes one on each screw, a plurality of adjustable nuts one carried in each nut box, screw caps to adjust and retain the nuts in position, and means to prevent the nut boxes from rotating, substantially as described.

3. Traverse mechanism gearing, comprising a central shaft; a plurality of double-threaded reversing screws disposed concentrically around said shaft; means for driving said screws from said shaft; a traveling nut box mounted on each screw; a nut movably fitted in each nut box; and a rotatable screw cap associated with each nut to move the same into or out of engagement with the threads of the adjacent screw.

4. Traverse mechanism gearing, comprising a central shaft; a plurality of double-threaded reversing screws disposed concentrically around said shaft; a traveling nut box mounted on each screw; a nut movably fitted in each nut box; a rotatable screw cap associated with each nut to move the same into and out of engagement with the threads of the adjacent screw; and gear connections between said screw and said shaft for driving all of the former from the latter.

5. Traverse mechanism gearing, comprising a central shaft; a plurality of double-threaded reversing screws disposed concentrically around said shaft; a traveling nut box mounted on each screw; a nut movably fitted in each nut box; a rotatable screw cap associated with each nut to move the same into and out of engagement with the threads of the adjacent screw; and gear connections between said screw and said shaft for driving all of the former from the latter; said shaft having a plurality of slots, one for each nut box, wherein said nut boxes are engaged, to control said nut boxes laterally.

In testimony whereof I have hereunto set my hand in presence of two subscribing witnesses.

WILLIAM CONNOLLY.

Witnesses:
 J. OWDEN O'BRIEN,
 GEO. H. O'BRIEN.

Copies of this patent may be obtained for five cents each, by addressing the "Commissioner of Patents, Washington, D. C."